March 28, 1933. J. F. LAFFERTY 1,903,120
GUARD FOR TRUCK CHAINS
Filed July 23, 1930
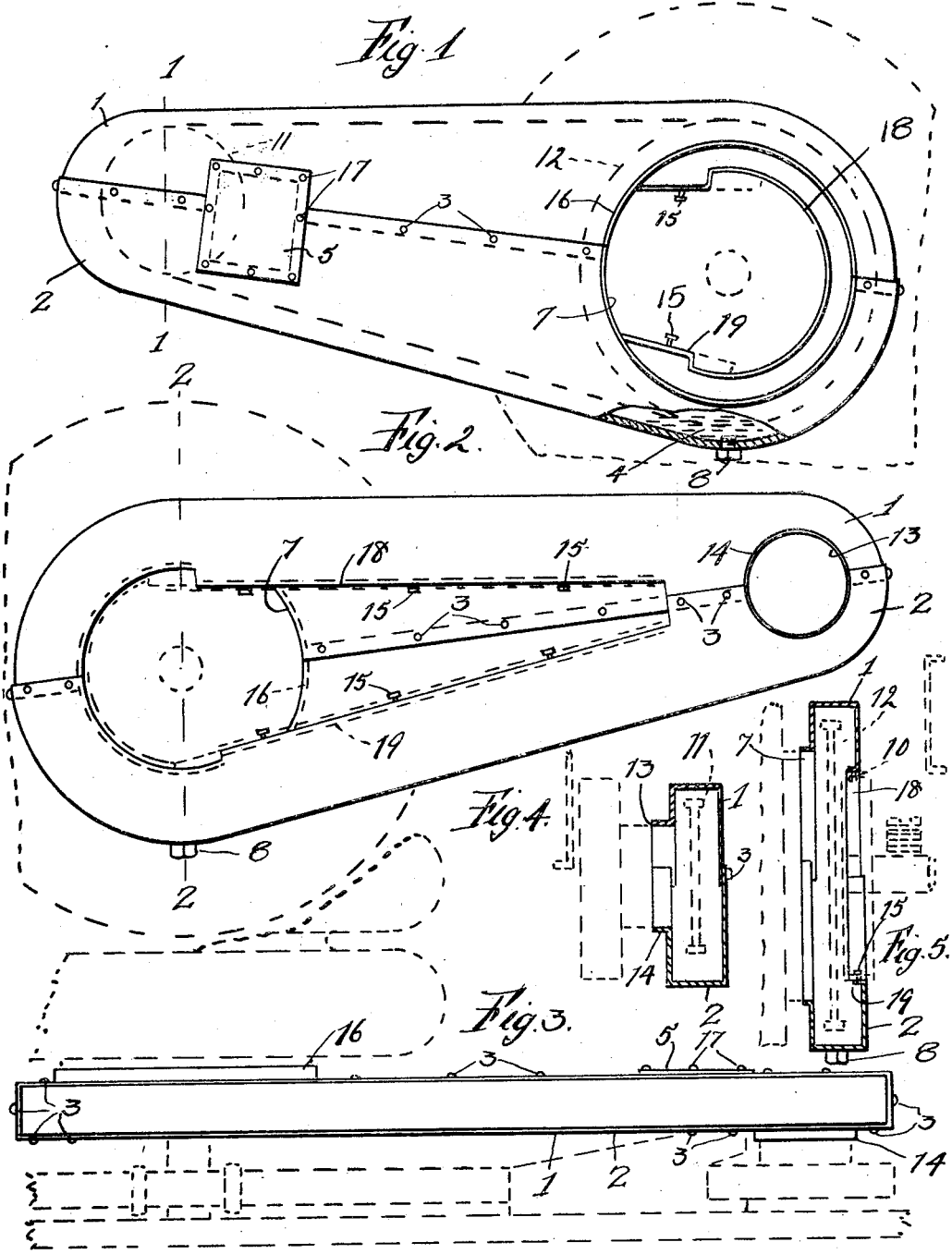

Patented Mar. 28, 1933

1,903,120

UNITED STATES PATENT OFFICE

JOHN F. LAFFERTY, OF HADDON HEIGHTS, NEW JERSEY

GUARD FOR TRUCK CHAINS

Application filed July 23, 1930. Serial No. 470,018.

My invention relates to new and useful improvements in a guard for truck chains and has for one of its objects to provide an exceedingly simple and effective device of this character to protect the chains of a motor truck and prevent dirt or other foreign matter from accumulating on the chains and sprockets thereby eliminating a condition which often breaks the chains or completely stops the operation of the motor truck due to "freezing" of the chains, sprockets and dirt.

Another object of the invention is to provide a guard for truck chains so that the same will be completely and entirely encased to prevent accumulation of dirt or other foreign matter and to act as a reservoir for lubricant whereby the chains and component parts will be constantly lubricated whereby the lives of the chains will be considerably increased resulting in a considerable saving in the operation of a truck.

A further object of the invention is to utilize the guard in combination with a broken drive chain as a brake for the truck. In trucks of present-day construction, when the drive chains break the braking mechanism becomes ineffective so that the operator is unable to bring the truck to a standstill. By the use of my invention, this condition is eliminated as parts of the chains will become wedged between the walls of the guards and the sprockets thereby stopping the wheels which will finally bring the truck to a standstill.

With these ends in view this invention consists in the details of construction and combination of elements hereinafter set forth and then specifically designated by the claim.

In order that those skilled in the art to which this invention appertains may understand how to make and use the same, I will describe one form of its construction in detail, referring by numerals to the accompanying drawing forming a part of this application, in which:—

Fig. 1 is an outer face view of a guard constructed in accordance with my invention and embodying the features enumerated above with one pair of sprockets, drive chain and rear wheel diagrammatically shown in dotted lines.

Fig. 2 is an inner face view thereof illustrating the connection of the guard with the radius rod.

Fig. 3 is a top plan view of the guard showing in broken lines the dual tires and wheel and portions of the truck to plainly illustrate the position and arrangement of the guard.

Fig. 4 is a section on the line 1—1 of Fig. 1.

Fig. 5 is a section on the line 2—2 of Fig. 2.

In carrying out my invention as herein embodied, the reference numerals 1 and 2 designate the two similar sections of the guard although one is preferably of less length and width than the other or at least at its meeting edge so that one telescopes into the other permitting them to be fastened by suitable fastening means 3, such as bolts passing through and through the side and end walls.

Both of the sections are trough or channel-shaped in cross section and the lower section 2 therefor acts as a reservoir for lubricant, indicated by the numeral 4 through which the drive chain 6 may pass and thus lubricate the connections between the different links as well as the contact surfaces between the chain and the sprockets 11 and 12. The sprocket 11 is the driving sprocket whereas the one designated by the numeral 12 is the driven sprocket.

The completed guard when in use is slightly smaller at the forward end than at the rear end and at or adjacent said rear end each section has a semi-circular opening formed in its outer face or wall so that when the guard sections are together, said semi-circular openings produce a complete circular opening 7 surrounded by an outwardly projecting flange 16 which snugly fits around the rear brake drum. In said outer face or wall adjacent the smaller end of each guard section is formed an aperture which when the guard sections are together provides an access opening which latter is normally closed by the cover plate 5 detachably fastened on the guard by screws, bolts or other suitable fastening means 17. By removing the cover plate 5, the driving chain may be adjusted or certain repairs made to the truck and grease, oil or other suitable lubricant may be placed in the guard.

In the inner face or wall of each section adjacent the smaller end is formed an aperture and when the guard sections are together, these apertures provide a circular opening 13 surrounded by an outwardly projecting flange 14 to snugly fit the bearing or housing of the shaft for the driving sprocket as shown in Fig. 4. Each guard section also has what might be termed a triangular shaped aperture formed in its inner face or wall from the edge thereof which, when the guard sections are together provide an opening 18 of suitable shape to fit the radius rod and rear wheel housing 10 and this opening is surrounded by an inturned flange 19 by which it may be bolted to said radius rod and rear wheel housing by bolts or other suitable fastening devices 15 so that said guard is rigidly held in place and is practically dust-proof.

In order that the lubricant may be withdrawn without removing the guard, a drain plug 8 is removably mounted in the bottom wall of the lower section 2 of the guard.

It is a well known and recognized fact that chain drive motor trucks have many advantages over all other types but the expense of keeping them in operating condition is rather high due to the fact that dirt, sand, gravel and other foreign material often accumulate between the chains and sprockets finally stopping the truck and this is especially so when working around soft ground so that the truck may get into a rut or hole and the chain drags on the ground. This will cause a speedy accumulation of foreign material between the chains and sprockets so that the truck cannot be operated. Such conditions require the use of another or other trucks to actually drag the stalled truck to one side where the chains have to be removed and the accumulations knocked out and sometimes actually cut out with a chisel. It has been found by the use of this device that these conditions are completely and entirely eliminated as little or no dirt can reach the inside of the guard so that the truck remains in service for greater length of time without repair thereby reducing the up-keep to a minimum.

It has also been found that by running the chain through a lubricant practically all of the noise is eliminated and since the lubricant cannot escape, it is unnecessary to replenish or renew the same except at long intervals.

While I have shown and described one form or construction of the invention particularly adapted for use on a single type of motor truck, it is to be understood that various changes may be made so as to adapt it to other types or makes of trucks without departing from the spirit of my invention.

Having thus fully described my invention, what I claim as new and useful is:—

A guard for motor truck drive chains comprising two similar sections, the meeting edges of which telescope and are fastened together, the outer wall having an opening therein to fit the rear brake drum and also provided with an access opening, a flange surrounding the first mentioned opening, a cover plate removably mounted across the access opening, the inner wall having a circular opening to fit over the bearing of the drive sprocket shaft and an irregular longitudinal opening to fit the radius rod and rear wheel housing, an outwardly projecting flange surrounding the circular opening, an inwardly projecting flange surrounding the irregular opening, and means to rigidly fasten the guard to the radius rod and rear wheel housing.

In testimony whereof, I have hereunto affixed my signature.

JOHN F. LAFFERTY.